United States Patent
Gouskov et al.

(10) Patent No.: US 6,793,775 B2
(45) Date of Patent: Sep. 21, 2004

(54) MULTIPLE TORCH—MULTIPLE TARGET METHOD AND APPARATUS FOR PLASMA OUTSIDE CHEMICAL VAPOR DEPOSITION

(76) Inventors: Mikhail I. Gouskov, St. Ivana Fomina 13-1, Apt. 604, 194352 St. Petersburg (RU); Evguenie B. Danilov, Boishevikov Pr. 9-2, Apt. 11, 193313 St. Petersburg (RU); Mohd A. Aslami, 7 Laurel Hill Dr., Sturbridge, MA (US) 01566; Dau Wu, 2510 Carmel Creek Rd. Apt. #193, San Diego, CA (US) 92130

( * ) Notice: Subject to any disclaimer, the term of this patent is extended or adjusted under 35 U.S.C. 154(b) by 339 days.

(21) Appl. No.: 09/804,465

(22) Filed: Mar. 13, 2001

(65) Prior Publication Data

US 2002/0174690 A1 Nov. 28, 2002

(51) Int. Cl.⁷ .................. C03B 37/018; C03B 37/07
(52) U.S. Cl. .................. 162/391; 162/382; 162/421; 162/426
(58) Field of Search .................. 65/391, 421, 426; 427/580, 255.37; 204/192.38; 162/382

(56) References Cited

U.S. PATENT DOCUMENTS

| | | |
|---|---|---|
| 3,966,446 A | 6/1976 | Miller |
| 4,157,906 A | 6/1979 | Bailey |
| 4,262,035 A | 4/1981 | Jaeger et al. |
| 4,286,978 A | 9/1981 | Bailey et al. |
| 4,402,720 A | 9/1983 | Edahiro et al. |
| 4,579,571 A * | 4/1986 | Hicks, Jr. .................. 65/397 |
| 4,599,098 A * | 7/1986 | Sarkar .................. 65/421 |
| 4,684,384 A * | 8/1987 | Berkey .................. 65/377 |
| 5,116,400 A | 5/1992 | Abbott et al. |
| 5,211,732 A | 5/1993 | Abbott et al. |
| 5,370,643 A | 12/1994 | Krivoshlykov et al. |
| 5,522,007 A * | 5/1996 | Drouart et al. .................. 385/141 |
| 5,609,921 A * | 3/1997 | Gitzhofer et al. .................. 427/446 |
| 5,692,087 A | 11/1997 | Partus et al. |
| 5,802,236 A | 9/1998 | DiGiovanni et al. |
| 6,110,544 A * | 8/2000 | Yang et al. .................. 427/580 |
| 6,138,478 A * | 10/2000 | Neuberger et al. .................. 65/391 |
| 6,253,580 B1 * | 7/2001 | Gouskov et al. .................. 65/391 |
| 6,365,016 B1 * | 4/2002 | Iacovangelo et al. .. 204/192.38 |
| 6,432,494 B1 * | 8/2002 | Yang et al. .................. 427/580 |
| 6,536,240 B1 * | 3/2003 | Gouskov et al. .................. 65/391 |
| 2002/0174690 A1 * | 11/2002 | Gouskov et al. .................. 65/382 |
| 2003/0085205 A1 * | 5/2003 | Lai et al. .................. 219/121.43 |
| 2003/0101772 A1 * | 6/2003 | Itoh et al. .................. 65/421 |
| 2003/0172681 A1 * | 9/2003 | Guskov et al. .................. 65/391 |

FOREIGN PATENT DOCUMENTS

| | | | |
|---|---|---|---|
| DE | 3037491 A1 * | 4/1981 | .......... C03C/13/00 |
| DE | 43 26 021 | 2/1995 | |
| EP | 163 071 | 12/1985 | |
| EP | 234947 A1 * | 9/1987 | ......... C03B/37/014 |
| EP | 476218 A1 * | 3/1992 | ......... C03B/37/014 |
| EP | 482348 A2 * | 4/1992 | ......... C03B/37/018 |
| GB | 2351287 A * | 12/2000 | ......... C03B/37/014 |
| JP | 04231336 A * | 8/1992 | ......... C03B/37/012 |
| WO | WO 00/75084 | 12/2000 | |
| WO | WO 200196253 A1 * | 12/2001 | ......... C03B/37/018 |

* cited by examiner

Primary Examiner—José A. Fortuna
(74) Attorney, Agent, or Firm—Patton Boggs LLP

(57) ABSTRACT

A plurality of glass deposition targets are rotated simultaneously and a first plasma torch, having a coil diameter larger than the sum of the target diameters, deposits glass simultaneously on the plurality. After the diameter of the targets reaches a threshold a second plasma torch is used. The diameter of the second plasma torch can provide for simultaneous deposition. In a further embodiment, after the target diameter reaches a second threshold a third plasma torch is used. In a further embodiment the spacing between the axes of rotation of the targets is widened as the target diameter increases. In a still further embodiment a single plasma torch includes movable concentric tubes within its coil to selectively operate as any of a plurality of different diameter plasma torches.

5 Claims, 12 Drawing Sheets

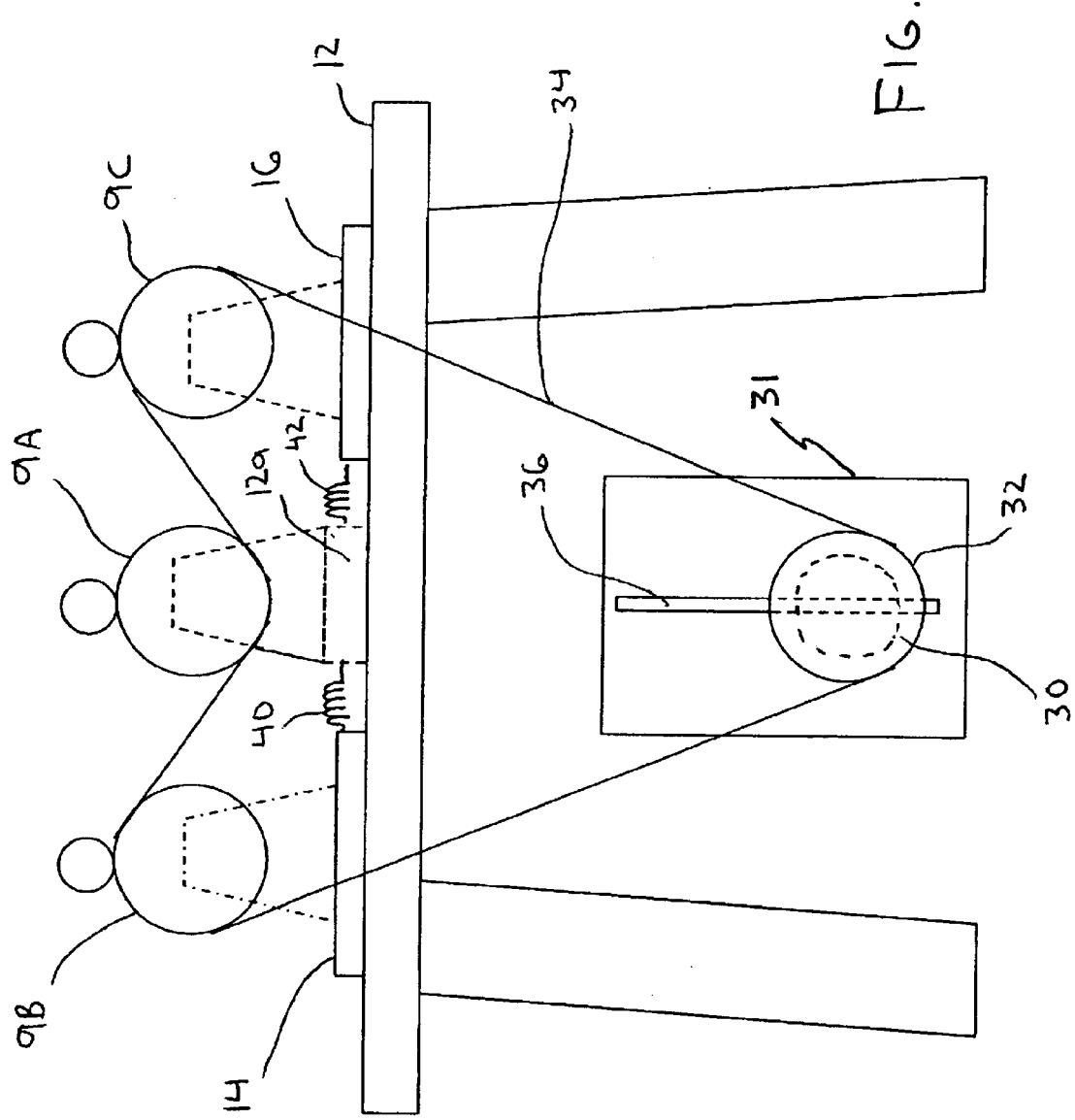

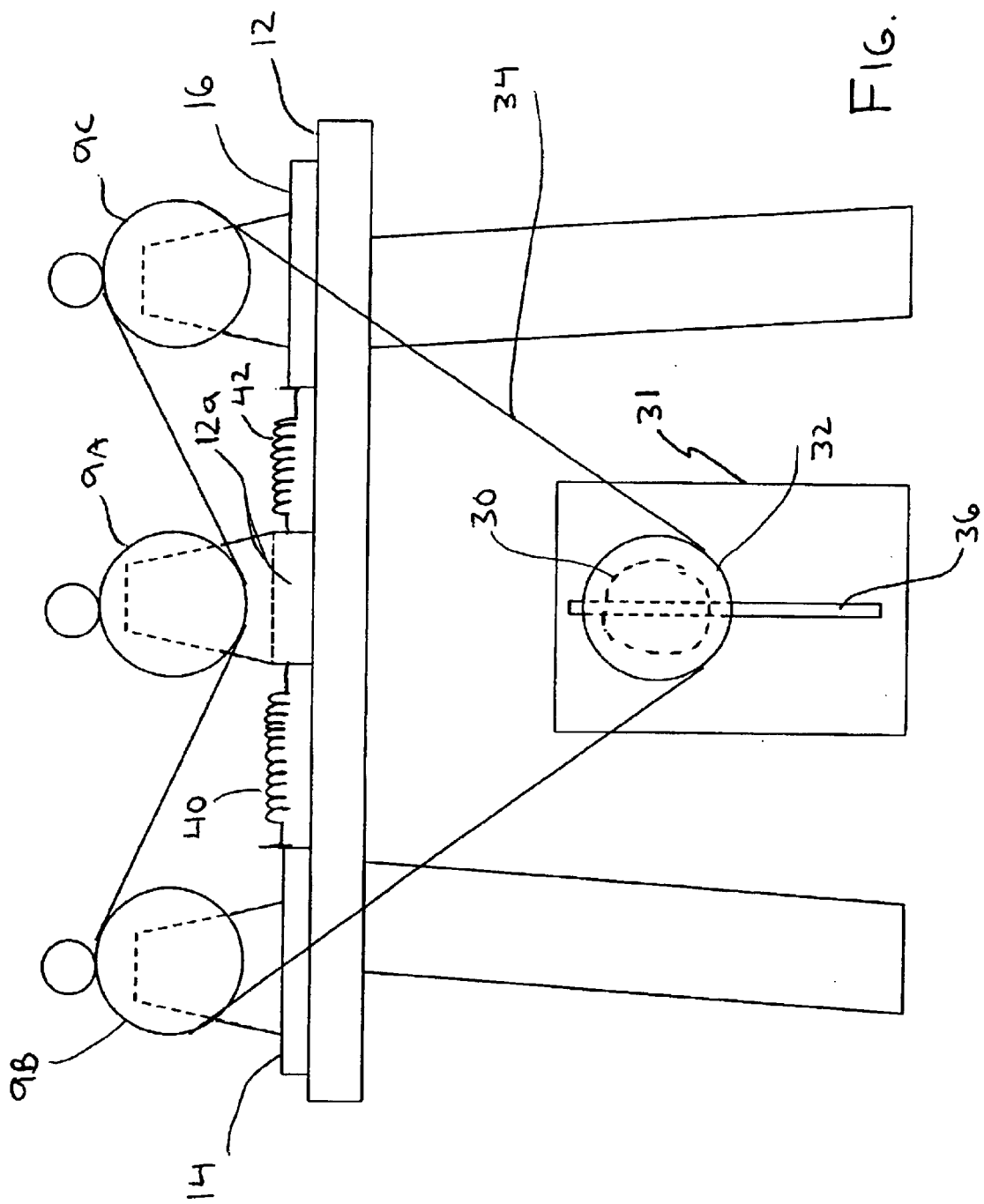

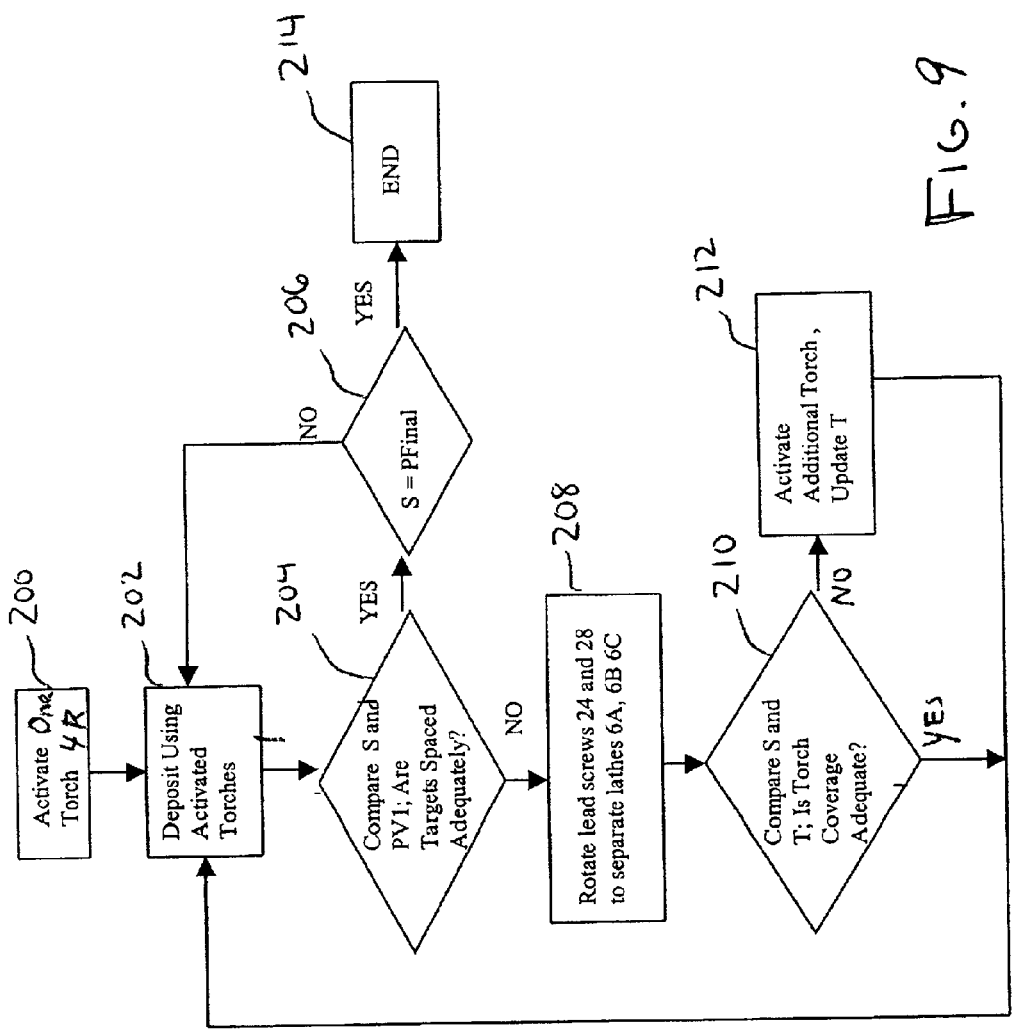

US 6,793,775 B2

MULTIPLE TORCH— MULTIPLE TARGET METHOD AND APPARATUS FOR PLASMA OUTSIDE CHEMICAL VAPOR DEPOSITION

DESCRIPTION

1. Field of the Invention

This invention relates generally to the field of optical fiber manufacture and, more particularly, to a method and apparatus for high rate processing of pure or doped silica tubes or fiber preforms for further processing into optical fibers.

2. Description of the Related Art

There are a variety of known apparatus and methods for forming synthetic silica tubes or preforms with a given cross sectional profile of their index of refraction. The methods include the Plasma Outside Vapor Deposition (POVD) process described by Applicants' patent application Ser. Nos. 09/588,312 ("the '312 application") and 08/994,970 ("the '970 application"), both of which are hereby incorporated by reference. The method described by the '312 application deposits one or more layers at a first deposition speed followed by depositing a layer at a second deposition speed that is lower than the first. As described by the '312 application, the first deposition speed is sufficiently high that the deposited glass is not heated to the consolidation temperature. Deposition at the lower second speed, however, consolidates both the instant deposited layer and the unconsolidated layers deposited previously at the first, higher, speed. As described in the '312 application, the first deposition speed can be 2.5 times faster than the second, or deposition/consolidation speed. The multi-rate processing procedure described in the '312 application thus attains up to double the deposition rate over that obtained in the prior art.

The present inventors, though, have identified a still further need for improving the processing rate attained with the Plasma Outside Vapor Deposition process, including the process carried out by the method and apparatus of the '312 application. More particularly, the present inventors have identified a shortcoming with the existing art, which is that a low deposition rate is obtained when the target is at its smaller diameter, i.e., during the early stages of deposition. Further, the present inventors have identified a need for improving the utilization of material over the utilization attained by the existing deposition processes.

SUMMARY OF THE INVENTION

An object of the present invention is to solve the above-identified shortcoming of the prior art's deposition rate. Another object is to improve the utilization of deposition material in the manufacturing of preforms.

A general method according to the present invention for achieving these and other objectives utilizes one or more first diameter plasma torches for depositing silica onto one or more targets to form a first intermediate preform having a first diameter, followed by an arrangement of one or more second diameter plasma torches for depositing silica onto the first intermediate preforms to form a succeeding intermediate preform or a final preform.

A first example method according to the invention comprises a first step of simultaneously depositing glass on a plurality of cylindrical targets to form a plurality of first intermediate preforms having a first diameter, using a first plasma torch, and a second step of simultaneously depositing glass on the plurality of first intermediate preforms to form a plurality of preforms, using a second plasma torch, wherein the first plasma torch has a first coil diameter and the second plasma torch has a second coil diameter, the first coil diameter being greater than the second coil diameter.

A further embodiment of this invention is a method comprising a first step of simultaneously depositing glass on a plurality of cylindrical targets to form a plurality of first intermediate preforms, using a first plasma torch, a second step of simultaneously depositing glass on the plurality of first intermediate preforms to form a plurality of second intermediate preforms, using a second plasma torch, and a third step of simultaneously depositing glass on the plurality of second intermediate preforms to form a plurality of preforms, wherein the first plasma torch has a first coil diameter, the second plasma torch has a second coil diameter, and the third plasma torch has a third coil diameter, the third coil diameter being larger than the second coil diameter and the second coil diameter being larger than the first coil diameter.

BRIEF DESCRIPTION OF THE DRAWINGS

The foregoing and other objects, aspects, and advantages will be better understood from the following description of preferred embodiments of the invention with reference to the drawings, in which:

FIGS. 8A and 8B show a first and second position of an arrangement of a second movable target spacing apparatus for the embodiment of FIGS. 6A and 6B;

FIG. 9 is a method flow diagram for an example operation of the FIGS. 6A and 6B embodiment;

DETAILED DESCRIPTION OF THE INVENTION

Table 1 below defines an optimal relationship between the target sizes and the diameters of the torch that has been identified by the inventors as obtaining a high deposition rate, while preserving proper plasma gas flow characteristics. This relationship of target size to torch diameters provides a deposition rate of approximately 3 grams/minute or higher, while preserving adequate plasma gas flow characteristics, and is therefore used for the example embodiments of the invention described herein.

TABLE 1

| Torch | Diameter of Targets (mm) | |
|---|---|---|
| Diameter (mm) | Minimum | Maximum |
| 60 | 30 | 75 |
| 80 | 35 | 95 |
| 100 | 40 | 120 |
| 120 | 45 | 140 |

The present inventors also analyzed the deposition rate by using the following equation:

$$\text{Deposition\_Rate} = \frac{\text{Weight}}{\text{time}} = \frac{\rho \times \pi/4 \times \text{Length} \times [(D + \Delta t)^2 - D^2]}{(\text{Length/Speed})} \quad (1)$$

$$= \rho \times \pi/4 \times \text{Speed} \times \Delta t \times (2 \times D + \Delta t)$$

$$\approx \rho \times \pi/2 \times D \times \text{Speed} \times \Delta t$$

Where:

$\rho$ is density of the glass which is a constant and is about 2.2 g/cc,

D is the diameter of the target, $\Delta t$ is the layer thickness for one deposition pass.

From the inventors' above equation (1), one of ordinary skill can observe the problem of there being a low deposition rate when the target diameter is small. As also seen from equation (1), another controllable parameter is the deposition speed. On its face, the mathematics of equation (1) indicates that a faster deposition speed automatically means a higher deposition rate. However, in practice, deposition rate does not work according to this equation alone. More particularly, when the deposition speed alone is increased, without other adjustments being made, the thickness of the deposited layer may be reduced, and/or the deposited glass may be unconsolidated.

The present invention solves these and other problems by utilizing multiple torches and multiple targets, as described for the example embodiments below, to maintain the relationship between torch diameter and target diameter within that represented by Table 1.

In addition, particular example combinations and modification options relating to the plasma torch are identified in the description below.

FIRST EXAMPLE EMBODIMENT

Figure 1:
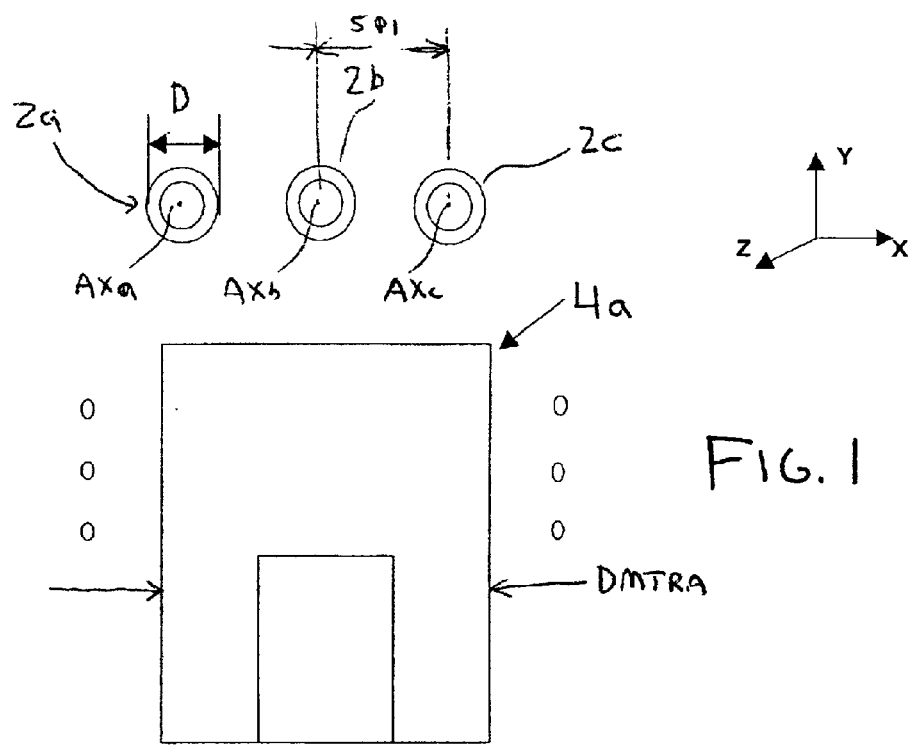
FIG. 1 depicts an arrangement for carrying out a first step in a first example method of the invention, using a single plasma torch for depositing silica onto three targets.
Figure 2:
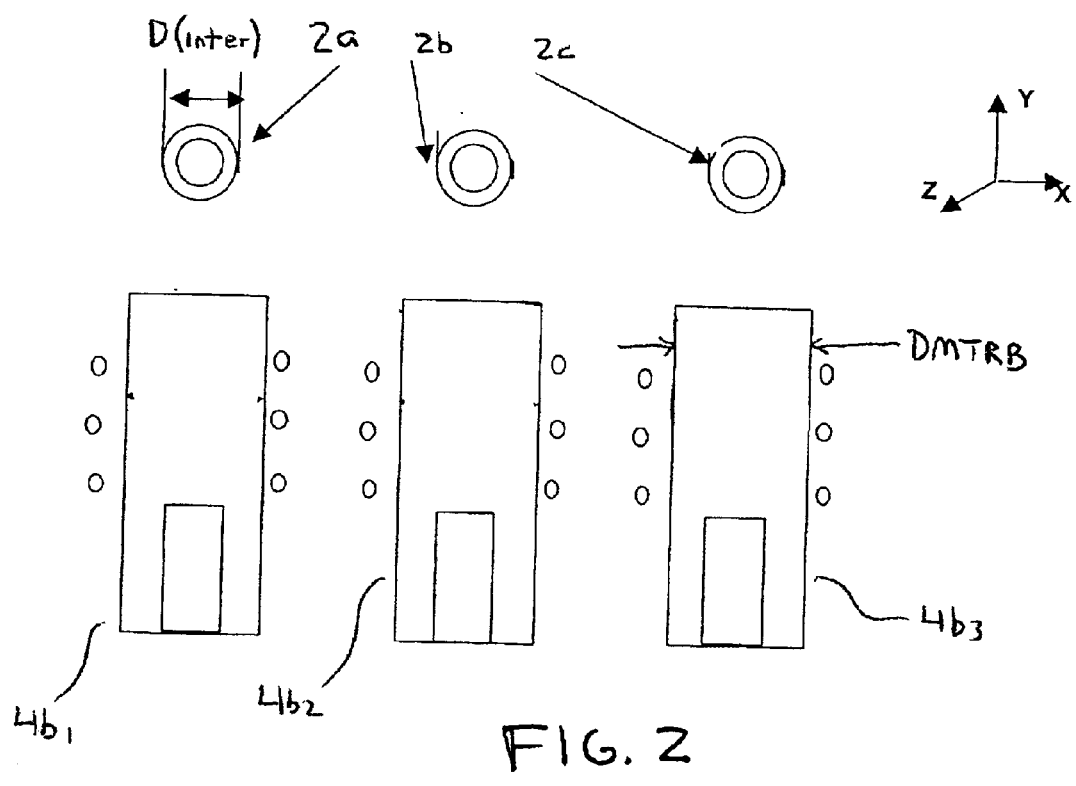
FIG. 2 depicts an arrangement for carrying out a second step in the first example method of the invention, employing three plasma torches for depositing silica onto three targets.

Referring to FIGS. 1 and 2 a first embodiment of this invention will be described. The described example carries out a two step deposition process. FIG. 1 illustrates the apparatus for the first step, and FIG. 2 illustrates the apparatus used for the second step.

Referring to FIG. 1, the apparatus and arrangement for the first step comprises a single plasma torch 4A and three deposition targets 2a, 2b and 2c, which are referenced collectively as item 2, each target held by a conventional chuck (not shown in FIG. 1) of a rotating glass working lathe, (not shown in FIG. 1), and rotated about the target's longitudinal axis, labeled AXa, AXb and AXc, respectively. In the FIG. 1 arrangement, the spacing between the respective axes AXa–AXb is fixed. Therefore, the rotation may be carried out by a three spindle lathe, and suitable models of such are available from a number of commercial suppliers known to persons skilled in the art.

Each of the longitudinal axes extends parallel to the reference axis labeled Z. The reference axis labeled Y is vertical to the target(s) 2, and normal to the Z-axis. From the perspective of an observer (not shown) facing the glass working lathe(s), the Y-axis is in the up and down direction with respect to the floor (not shown). The X-axis is perpendicular to the YZ-plane and, from the perspective of the observer described for the Y-axis, the X-axis is in the in-and-out direction with respect to the target, normal to the Z-axis. The described X, Y, Z reference axes apply to all other embodiments described herein.

The plasma torch 4a is mounted below the targets 2 on a lathe carriage attachment (not shown), such that the plasma torch is movable toward and away from the targets 2 in a direction parallel to the reference axis labeled Y. The lathe carriage (not shown) is movable in the Z-direction along the length of the targets 2 by a lead screw (not shown) of the lathe (not shown).

An example plasma torch 4a is in accordance with that described by the copending '970 application, which is hereby incorporated by reference. In the preferred embodiments of this invention the plasma torch 4a, and all other plasma torches described herein include stabilizer bars and injection ports (nozzles), and a coil made UD of a plurality of windings, labeled respectively as item 58, 60, 52 and 54 in the '970 application. The purpose and function of the stabilizer bars and injection ports 58 and 60, coil 54 and windings 52 are as described in the '970 application.

Step one using the FIG. 1 apparatus will now be described. First, deposition begins with the single plasma torch 4a, having a diameter labeled DMTRA, traversing the length of the targets along the Z axis and depositing glass onto all three targets at once. Before the deposition starts each of the targets has an initial diameter D (start). For this example the plasma torch diameter DMTRA is 100 mm and D(start) is 25 mm. The center-to-center spacing between the targets for step one is SP1. For this example SP1 is 40 mm. The deposition of step one continues until the targets' diameter reaches a predetermined interim diameter, D(inter). An example D(inter) is 35 mm, which corresponds to the example D(start) and DMTRA values. The total deposition rate on the three targets for step one, using the D(start) and DMTRA and SP1 values of this example, is more than 10 grams/min.

Referring to FIG. 2, after the deposition of step one achieves the D(inter) target diameter, the plasma torch 4a of FIG. 1 is switched off and three new plasma torches, labeled as 4b1, 4b2 and 4b3, are switched on. Each of the plasma torches 4b1, 4b2 and 4b3 has a diameter DMTRB, which for this example is 70 mm. The arrangement of the three plasma torches with respect to the single plasma torch 4a is a matter of design choice. An example arrangement is to mount the three torches 4b1, 4b2 and 4b3 at positions displaced from the torch 4a in the Z-axis such that either group can be turned on and operated without physical interference from the other.

Referring to FIG. 2, the arrangement of step two deposits glass onto the three targets 2 using the three plasma torches 4b1, 4b2 and 4b3 until the diameter D reaches a predetermined D(final) which, for example, is 75 mm.

The average deposition rate during step two of this example, for each target, is about 10 gram/min. This second step therefore achieves a total deposition rate for the three targets of about 30 g/min.

The two-step process of FIGS. 1 and 2 is described only as an example of the present invention, and is not a limit on the number of steps or on the number of different diameters of torches. For example, if a final target diameter D(final) of 100 mm instead of 75 mm were desired, then a third step (not shown) would be carried out using three more plasma torches (not shown), each having a diameter of 100 mm. Further, FIG. 2 shows step two being carried out with three torches, 4b1, 4b2 and 4b3, mounted on a single target-rotating equipment (not shown). Alternatively, the second step can be carried out by mounting the three individual targets 2 formed by the first step onto three separate lathes (not shown). Each of the three lathes (not shown) would have a single torch similar to any of 4b1, 4b2 and 4b3. This alternative means for carrying out the second step would achieve, at each piece of equipment, an average deposition rate of 10 grams/min for the final target diameter of 75 mm.

SECOND EXAMPLE EMBODIMENT

Figure 3:
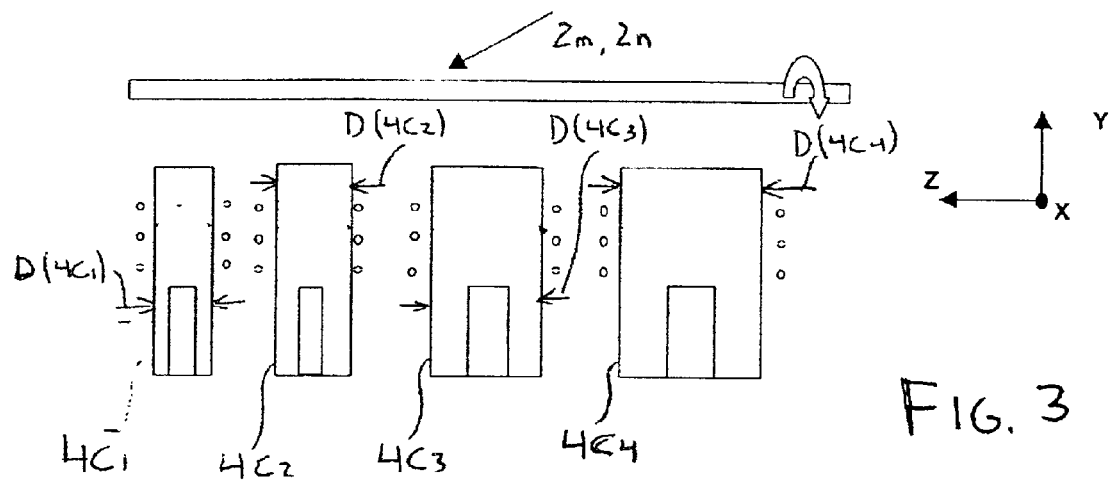
FIG. 3 depicts an arrangement of torches for carrying out a second example method according to the invention, viewed from an X-axis direction.
Figure 4:
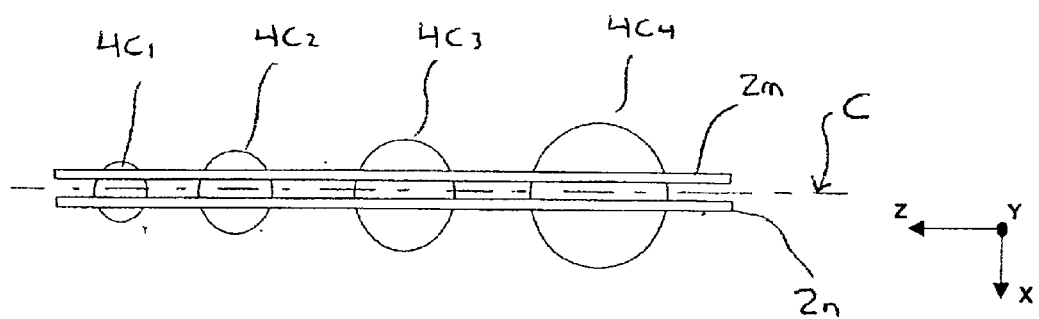
FIG. 4 shows the arrangement of torches according to FIG. 3 viewed from a Y-axis direction.
Figure 5:
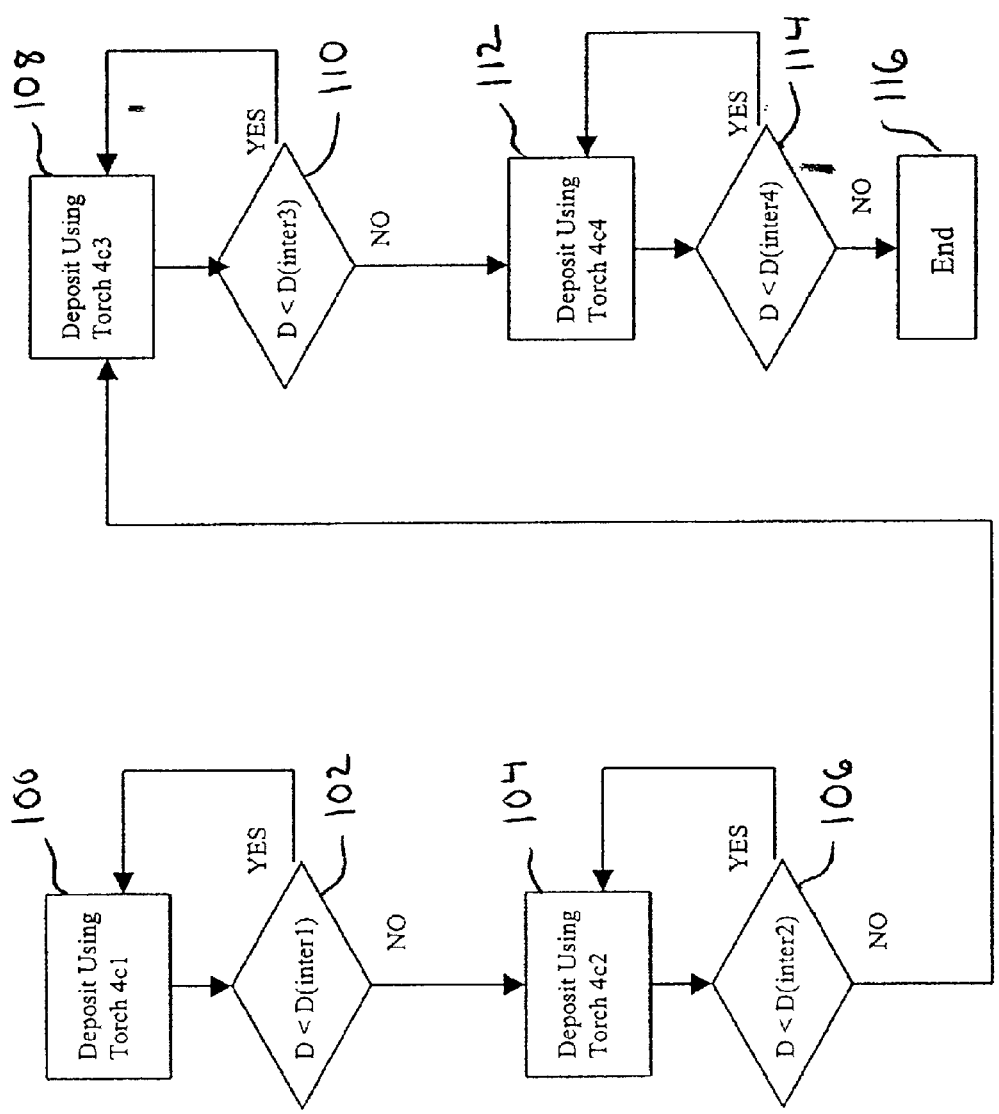
FIG. 5 is a method flow diagram for an example operation carried out using the apparatus of FIGS. 3 and 4.

Referring to FIGS. 3, 4 and 5, a second example apparatus and method of this invention will be described. Referring first to FIGS. 3 and 4, this example arranges four plasma torches, labeled as 4C1, 4C2, 4C3 and 4C4, displaced from one another along the Z-axis, each pointed toward two targets 2 in the Y-axis direction. The leftmost plasma torch 4C1 has a diameter D(4C1) which is the smallest of the four, followed in increasing order by the diameters D(4C2), D(4C3) and D(4C4) of the torches 4C2, 4C3 and 4C4, respectively. For this example, D(4C1)=60 mm, D(4C2)=80 mm, D(4C3)=100 mm, and D(4C4)=120 mm.

Each of the two targets 2m and 2n has an initial diameter (not labeled) which, for this example, is 25 mm, and each is supported within a lathe chuck (not shown) or equivalent target rotation apparatus. As depicted in FIG. 4, the two targets 2 extend parallel to one another in the X-Z plane, substantially symmetric about the center axis C of the torches.

Referring to FIG. 5, an example method carried out with an apparatus according to FIGS. 3 and 4 will be described.

The first step of this example, labeled as 100 in the flow chart of FIG. 5, begins by depositing glass on the two targets 2n and 2m using the smallest diameter torch 4C1. The deposition continues until step 102 detects the tube diameter D having reached a predetermined first intermediate value D(inter1) which, for this example, is 35 mm. The total deposition rate on the two targets 2 during step one of this example is more than 10 grams/min.

Next, at step 104, the smallest plasma torch 4C1 is switched off and the next larger, adjacent plasma torch 4C2 is switched on, and deposition commences with the torch 4C2. As stated above, for this example the diameter D(4C2) of the 4C2 plasma torch is 80 mm, as compared to the 60 mm diameter D(4C1) of the plasma torch used for the first deposition step. The step 104 deposition continues until step 106 detects the tube diameter D reaching a predetermined second intermediate value D(inter2) which, in view of the torch diameters of this example, is 45 mm. The total deposition rate on the two targets 2 during step 104 is more than 16 g/min. The increased rate results, in significant part, from the larger diameter of the plasma torch 4C2, which better matches the starting diameter, i.e., 35 mm, of the tubes 2, than any of the other three plasma torches.

Next, at step 108 of FIG. 5, the plasma torch 4C2 is switched off and the next larger diameter plasma torch 4C3 with a diameter D(4C3) of, for this example 100 mm, is switched on and used to deposit glass on the targets 2. The step 108 deposition continues until step 110 detects the tube diameter D reaching a predetermines third intermediate value D(inter3) which, for this example, is 60 mm. The process then ends at step 110. The total deposition rate on the two targets 2 during step 108, using the torch and target parameters identified for is more than 20 grams/min.

Next, at step 112, the plasma torch 4C3 is switched off and the next larger diameter plasma torch 4C4 with a diameter D(4C4) of, for this example 120 mm, is switched on and used to deposit glass on the targets 2. The step 112 deposition continues until step 114 detects the tube diameter D reaching a final value D(final) which, for this example, is 70 mm. The total deposition rate on the two targets 2 during step 112 is more than 26 g/min.

The described apparatus of FIGS. 3 and 4 and the described method of FIG. 5 are for purposes of example only. The multiple torch process can be continued, with additional torches (not shown), or with another target-rotation and torch apparatus (not shown) until any desired target diameter is reached.

The described apparatus of FIGS. 3 and 4 uses a single high frequency generator (not shown) to supply the required power to all of the described plasma torches. An example generator is a variable power Model No. IG 120/5000 from Fritz Huttinger Electronic GmbH of Germany, outputting up to 120 kW at a frequency of 5.00 MHz (+/−0.13 MHz) to energize the plasma torches. The example generator is driven with a commercially available 50 Hz, 3-phase 380 V power supply.

THIRD EXAMPLE EMBODIMENT

Figure 6A:
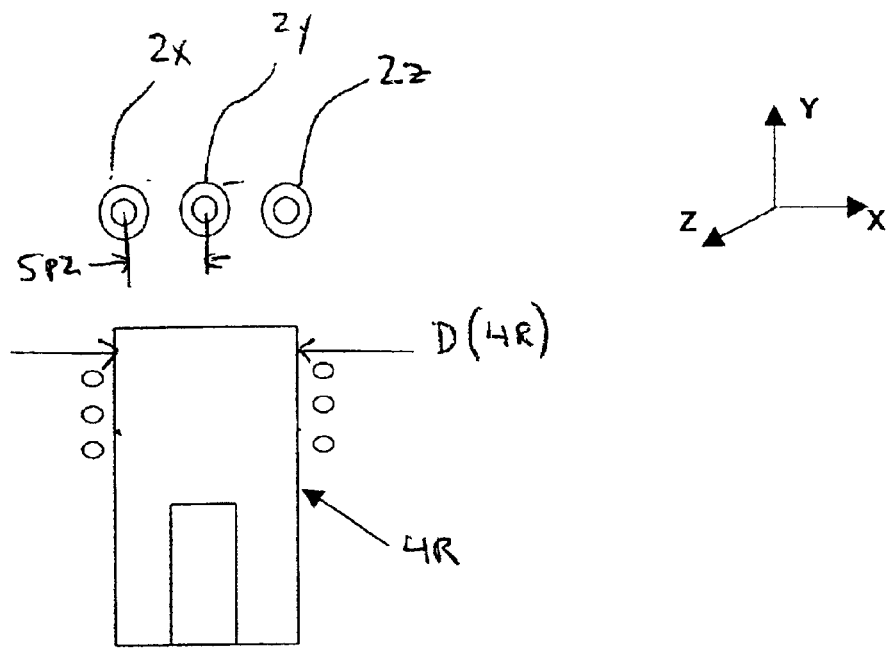
FIGS. 6A and 6B show a first and second position and arrangement of plasma torches and targets for a third example embodiment, having apparatus for controlled and movable spacing between adjacent targets.

Referring to FIGS. 6A through 9, another embodiment of the invention will be described. Referring first to FIG. 6A the general feature of this embodiment is that multiple targets, in this example the number being three, labeled as 2x, 2y and 2z, respectively, are each mounted within a respective rotating drive means, such as a lathe (not shown). The lathes are controllably moved apart with respect to one another in the X direction, by apparatus described in reference to FIGS. 7A through 8B. The movement of the lathes progressively separates center-to-center spacing SP2 of the targets 2x, 2y and 2z as their diameters increase from the deposited glass, thereby maintaining the spacing SP2 between the adjacent targets as the glass is deposited.

Figure 6B:
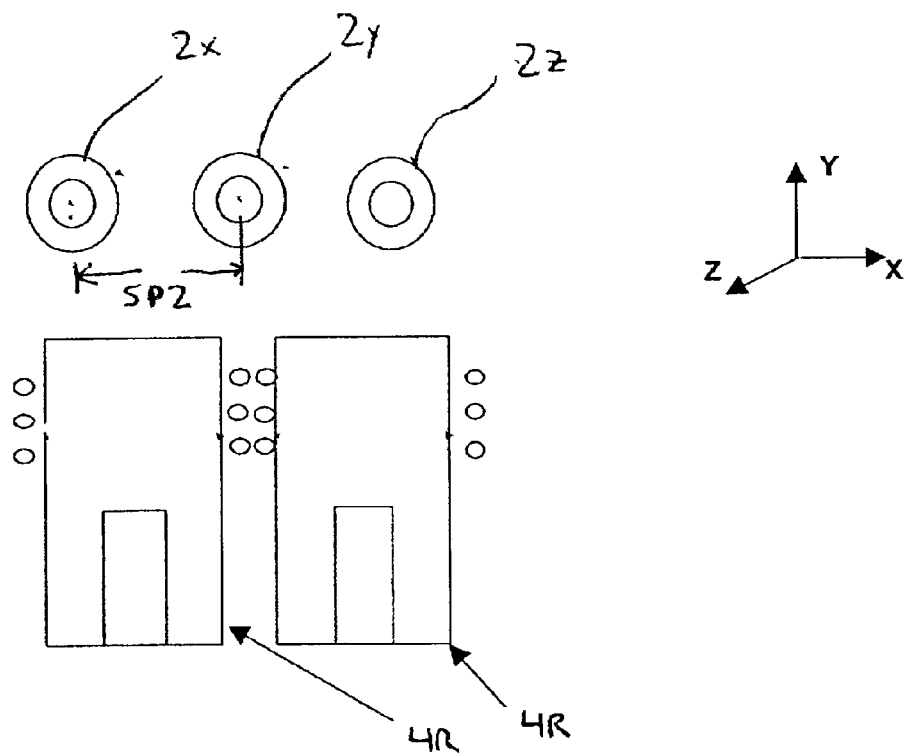

FIG. 6A shows a starting position of the targets 2, and FIG. 6B shows a second and wider center-to-center spacing SP2. Referring to FIG. 6A, in the starting position of the targets a single torch 4D1 is employed. An example torch 4D1 has a diameter D(4R) of 100 mm, corresponding to an example starting diameter of 25 mm for the three targets 2. Referring to FIG. 6B, a second center-to-center spacing SP2 position corresponds to a target diameter of 35 mm. For the FIG. 6B position two torches 4D1 and 4D2 are employed, each having, for the 35 mm target diameter, a diameter D(4R) of 100 mm.

Figure 7A:
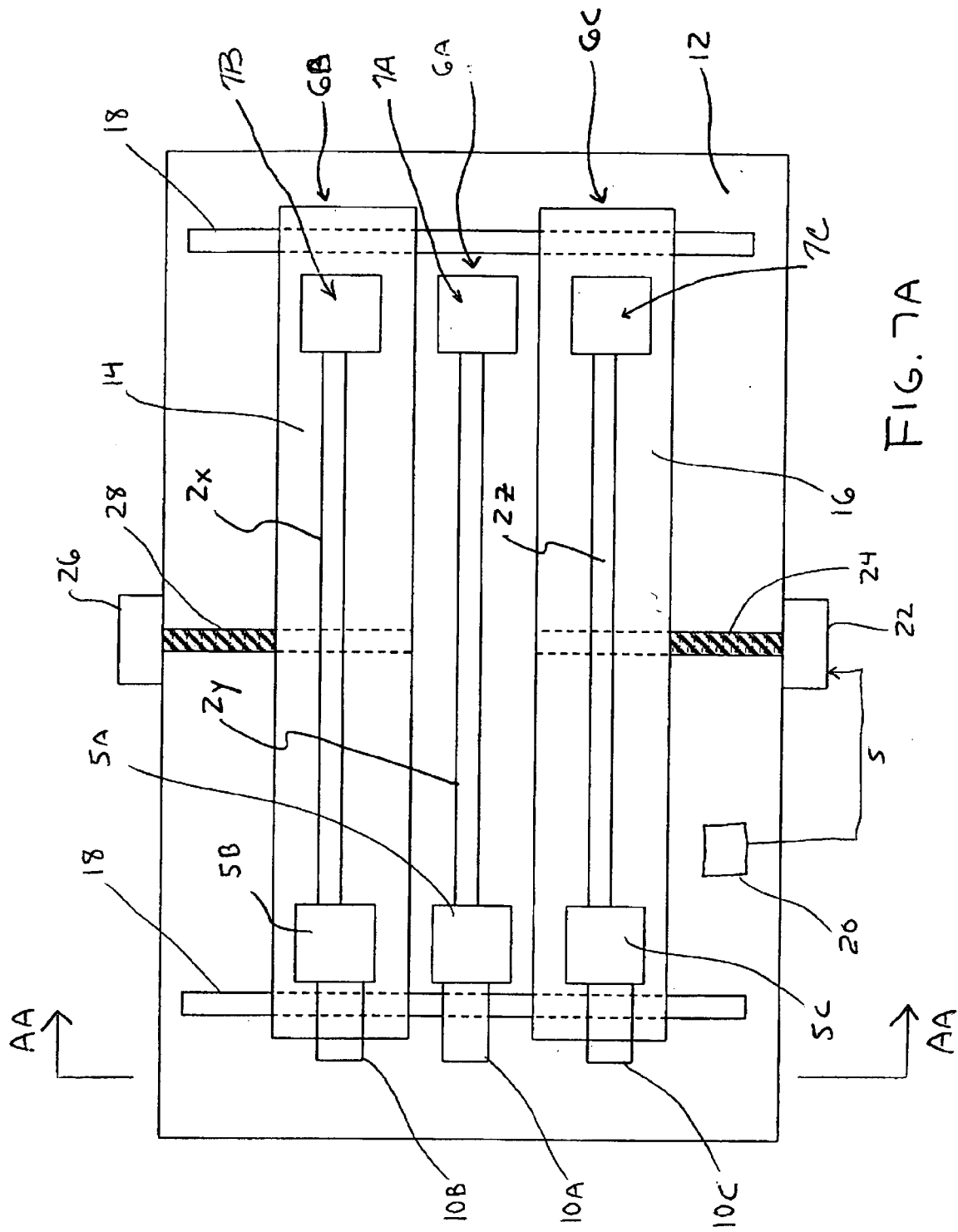
FIGS. 7A and 7B show a first and second position of an arrangement of a first movable target spacing apparatus for the embodiment of FIGS. 6A and 6B.
Figure 7B:
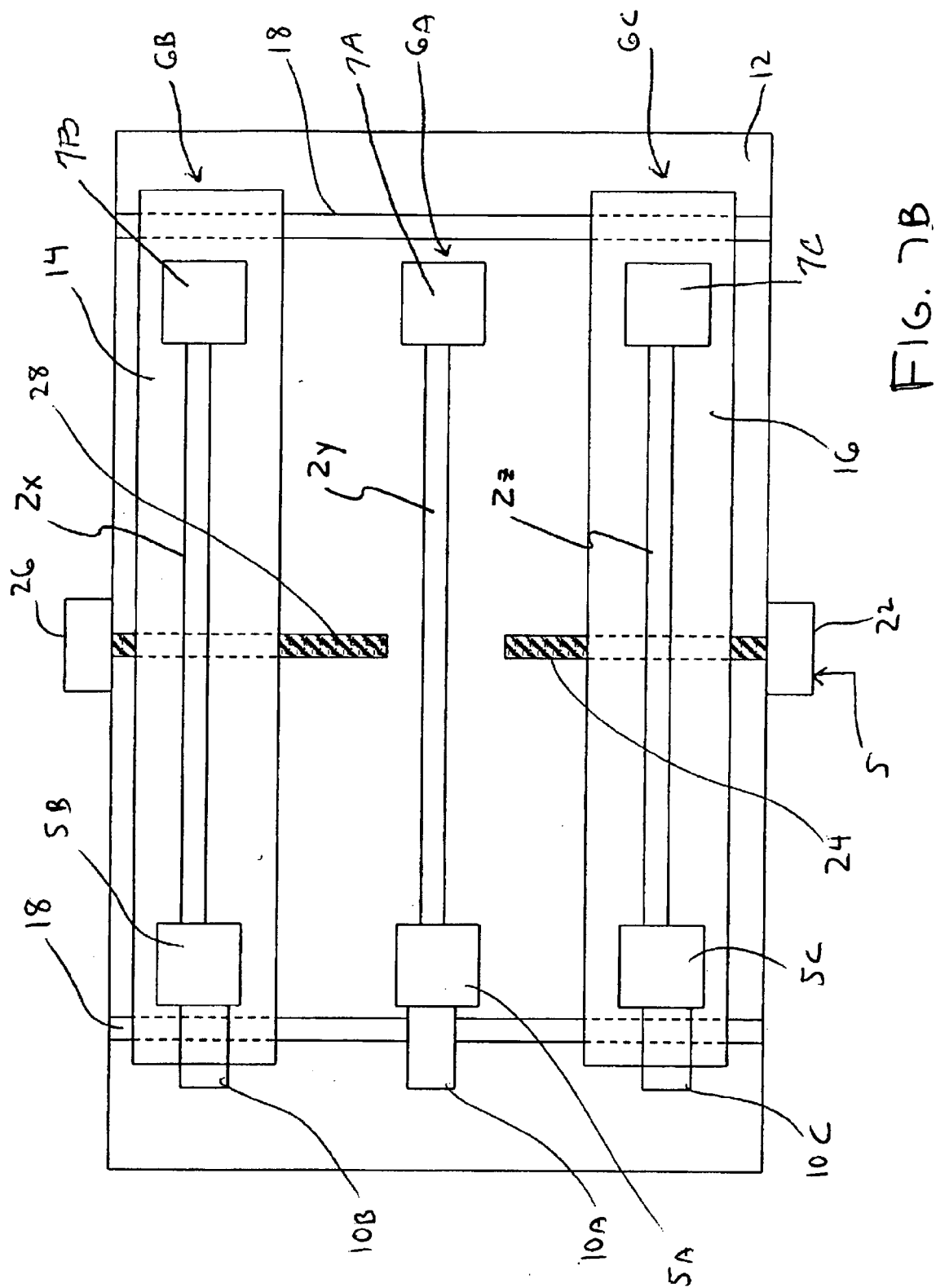

Two example mechanisms and apparatus for the feature generally described above by FIGS. 6A and 6B are shown, the first by FIGS. 7A and 7B, and the second by FIGS. 8A and 8B.

FIGS. 7A and 7B depict a first mechanism for translational movement of three lathes, 6A–6C, relative to one another in the X direction, with the two figures showing the same mechanism in a first and a second position, respectively. Each of the three lathes 6A–6C is a commercially available glass-working lathe such as, for example, the units sold by Arnold™, Heathway™ or Litton™, with a support platform modified as described and depicted. The lathes 6A–6C each comprise a pair of rotating chucks, which are housed at the headstock labeled 5A, 5B, and 5C, respectively, and also the tailstock labeled 7A, 7B and 7C, respectively, for supporting the targets. The spindle drivers are for rotating the chucks, labeled 10A, 10B, and 10C.

As shown in FIGS. 7A and 7B, the center lathe 6A is mounted on platform 12, lathe 6B on platform 14, and lathe 6C on platform 16. Platform 12 is shown as the larger structure because, in addition to being the mounting support for lathe 6A, it is the major support for the other two platforms 14 and 16. The platform 14 and platform 16 each have cooperating way guides (not shown) which engage with and slide along the ways 18 in the X direction. The machine ways 18 may be V-shaped, inverted V-shaped, round, or of any other of the plurality of well-known way configurations extant in the art of machine tools. In the example shown in FIG. 7A, two machine ways 18 are mounted to a top surface (not labeled) of the platform 12. The above described structure and arrangement of the platforms 12, 14, and 16 is readily implemented by one of ordinary skill in the art using commercially available machine tool mounting hardware.

Referring to FIG. 7A, a target diameter sensor 20 detects the diameter of one or more of the targets 2 and generates a corresponding signal S. The target sensor 20 is described by co-pending application Ser. No. 09/058,207, which is hereby incorporated by reference. An example target sensor 20 is a Laser Micro Diameter Monitor, Model # LDM-100A, made by LAP GmbH. The first lathe position drive 22 controllably rotates a first lead screw 24 in response to the control signal S. The first lead screw 24 engages with a cooperative threaded guide (not shown) in the platform 14. The specific structure, dimension and type of the lead screw 24, and of the cooperative threaded guide as well, is readily selected from among numerous commercially available lead screw components using selection and design criteria well known to one of ordinary skill in the relevant art of machine tools. A second lathe drive 26 controllably rotates a second lead screw 28 in response to the control signal S received from the target sensor 20.

Referring to the general embodiment of FIGS. 6A and 6B, two identical plasma torches, labeled 4D1, and 4D2, respectively, are positioned along the X-axis. The third plasma torch 4D3 (not shown) will be activated when the diameters of the targets are further increased and, to maintain spacing between their respective outer surfaces, their center-to-center spacing must be increased. The torches have a diameter D(4R) of, for example, 100 mm. FIGS. 7A and 7B are for purposes of describing an example arrangement for the movable lathes 6 and, therefore, do not show the plasma torches 4D1, 4D2 and 4D3.

Referring to FIG. 9 an example operation of the system of FIGS. 6A and 6B, using the lathe arrangement of FIGS. 7A and 7B, will be described.

At step 200 the deposition process begins by turning on, or activating a single torch 4D1, then proceeding to step 210 traversing it along the length of the three targets 2. The diameter D(4R) of a single torch 4D1 is chosen to be sufficient to cover all three of the targets 2, at their initial diameter. As the deposition proceeds, the target sensor 20 detects the increasing diameter of the targets 2 and outputs a corresponding value of the signal S. Step 204 compares the signal S to a value PV1 representing the spacing position of the lathes 6A, 6B and 6C which, in turn, indicates the center-to-center spacing between the targets. The comparison identifies if the targets are spaced adequately from one another in consideration of their increased diameter from the deposition. If the answer at step 204 is "yes", the process goes to step 206 compares the S value, representing the target diameter, to determine of the targets have reached their final processing diameter. If the answer is "no" (which is expected at the beginning of the processing), the process lops back to step 202 and continues deposition.

If the answer at step 204 is "no", meaning that the targets are no longer adequately spaced, the process goes to step 208 where the first and second lathe position drives 22 and 26 rotate the first and second lead screws 24 and 28, respectively, which moves the platforms 14 and 16 away from the center platform 12. This moves lathes 6B and 6C apart from the center lathe 6A. The value of PV1 is updated accordingly to reflect the new spacing position of the lathes.

The first and second lathe position drives are preferably programmed to effect a stepped motion of the lathes, wherein the lathes 6B and 6C are moved to an incremental next position each time the target diameter sensor 20 detects the target 2 diameters reaching a next predetermined value. In addition, the first and second lathe position drives are preferably programmed to change the position of lathes 6B and 6C at the end of, rather than during a deposition pass.

After step 208 moves the lathes 6B and 6C, step 210 compares the S signal to a first torch control parameter T to determine if the diameter D(4R) of the single torch 4D1 is sufficient to cover all three targets 2. If the answer is "Yes", the process loops back to step 202 and deposition proceeds with torch 4D1. If the answer at step 210 is "No", meaning that one torch 4D1 alone cannot efficiently deposit glass on all three targets, the process goes to step 212 and the next torch, in this case another torch 4D2 arranged next to the first torch 4D1 as in FIG. 6B, is switched on. Associated with step 212, the center-to-center spacing of the two torches are automatically adjusted to ensure proper coverage of all the targets 2. The process then loops back to step 202 and continues the deposition with the two activated torches 4D1 and 4D2. The process continues, with step 208 increasing the center-to-center spacing between the targets to compensate for their increasing diameter, and with steps 210 and 212 activating and positioning additional torches as needed, until step 206 detects that the targets have reached their desired final diameter. The process then goes to step 214 and ends.

The overall deposition rate using the apparatus of FIGS. 6A and 6B, and the particular example lathe arrangement of FIGS. 7A and 7B is very similar to that of Example 1. The process at step 212 continues until the targets reach the predetermined final target diameter D.

The lathes 6A–6C of FIGS. 7A and 7b are conventional glass working lathes having modified supports as described above. Accordingly, each of the lathes 6A–6C has an individual spindle drive, with the three drives being labeled 10A through 10C. FIGS. 8A and 8B show two positions of the same apparatus which, as will be described below, removes the redundant drives 10A through 10C and, still further, removes the lead screws 24 and 28. For ease of description the apparatus of FIGS. 8A and 8B are projections in the AA direction of FIGS. 7A and 7B, with like structure labeled by identical numbers.

Referring to FIG. 8A, the platforms 14 and 16 are supported on the ways 18 of FIGS. 7A and 7B (not shown in FIG. 8A) on the top of platform 12, as described for the Third Example Embodiment. A lathe motor 30 having a drive sprocket 32 is mounted in a support 31 in a cooperative and movable arrangement with respect to vertical guide slot 36. Each of the lathe chucks 5A through 5C of FIGS. 7A and 7B, which are not shown in FIGS. 8A and 8B, has a sprocket, labeled as 9A through 9C, respectively. A drive chain 34 extends around the driving sprocket 32 and the three lathe sprockets 9A through 9C. Accordingly, the single lathe motor 30 provides the rotational drive for all of the lathe chucks 5A through 5C. A conventional servo drive 38 is shown mounted in support 31 in FIGS. 8A and 8B, and which is readily selectable from commercially available units, by a person of ordinary skill in the art, controllably positions, in a vertical direction, the lathe motor 30 in response to the above-described control signal S. A bias spring 40 is arranged between a center structure 12a of the platform 12 and the platform 14, and a bias spring 42 is arranged between the center structure 12a and the platform 16. Bias springs 40 and 42 urge platforms 14 and 16 in the X direction away from platform 12. Platform 12 is fixed, as described in reference to FIGS. 7A and 7B.

FIG. 8A shows the rotating drive motor at its lowest vertical position. At this lowest position the tension of the drive chain 34 pulls the outer sprockets 9B and 9C toward the inner sprocket 9A, against the force of bias springs 40 and 42. Accordingly, the lathe chucks 5B and 5C are at their closest position relative to the center lathe chuck 5A.

The deposition process begins with the apparatus in the position shown by FIG. 8A, using the same plasma torch apparatus as described in reference to FIG. 7A of the Third Example Embodiment. As the deposition continues the diameters of the targets 2x, 2y and 2z increase. Target diameter sensor 20 outputs a control signal S indicative of the target 2 diameter, as described above, which is received by the servo drive 38. The above-described servo drive, in response, moves the lathe motor 30 to a higher position. As the lathe motor 30 moves upward there is resulting slack in the drive chain 34. The bias springs 40 and 42 take up the slack by urging the platforms 14 and 16 away from to take up the slack, whereupon the platforms 14 and 16 assume a position spaced further from the center platform 12 in the X direction. The deposition continues until the targets reach another designed diameter, whereupon the servo drive moves the lathe motor 30 to a next upper position. As described above, the bias springs 40 and 42 correspondingly urge the platforms 14 and 16 to a next outward position with respect to the center platform 12. The process of detecting the target diameter and moving the lathe motor 30 upward in response continues until the final designed diameter is reached. Referring to FIG. 8B, an example position of the lathe motor 30 and the platforms 14 and 16, when deposition has obtained the final designed diameter is shown. The total moving distance of the rotating drive motor 30 controls the overall traversal of the outside lathe chucks 5B and 5C.

The arrangement of the lathe motor 30, support 31, guide slot 36 and servo drive 38 is for purposes of example only. Many alternative arrangements can be seen by one of ordinary skill upon reading this description. For example, the lathe motor may be mounted on a pivoting swing arm (not shown), which is moved about a pivot point (not shown) in an arc fashion.

Still further, if greater precision of positioning the platforms 14 and 16 is desired, the first and second lead screws 24 and 28, and drives 22 and 26 described in reference to FIGS. 7A and 7B may be retained. In this case, the vertical movement of the lathe motor 30 by the servo drive 38 must be synchronized with the rotation of the lead screws 24 and 28 to maintain proper tension of the drive chain 34.

FOURTH EXAMPLE EMBODIMENT

Figure 10:
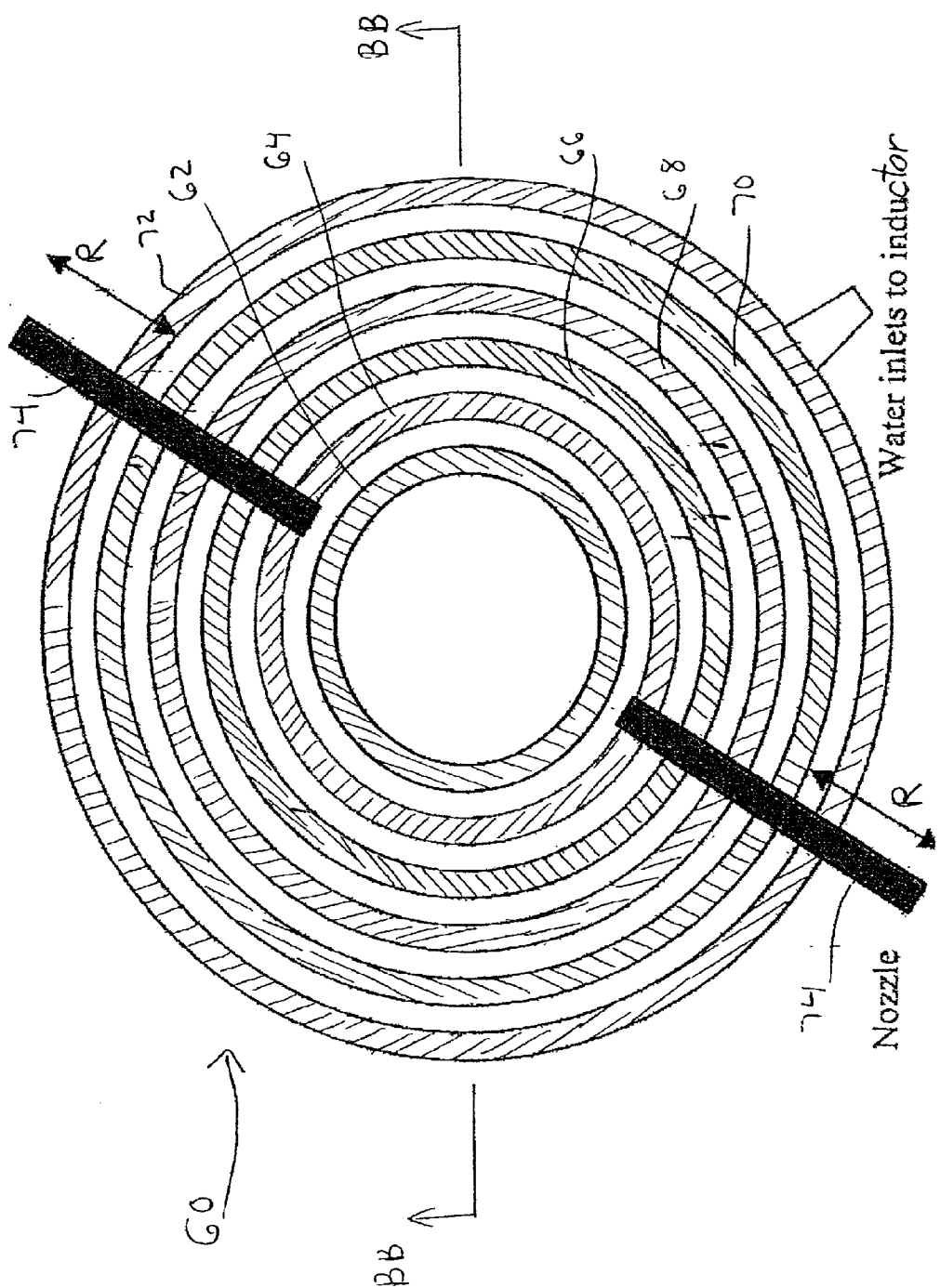
FIG. 10 is a top view of a variable diameter plasma torch configuration for carrying out one or more steps of methods of previously described embodiments.
Figure 11:
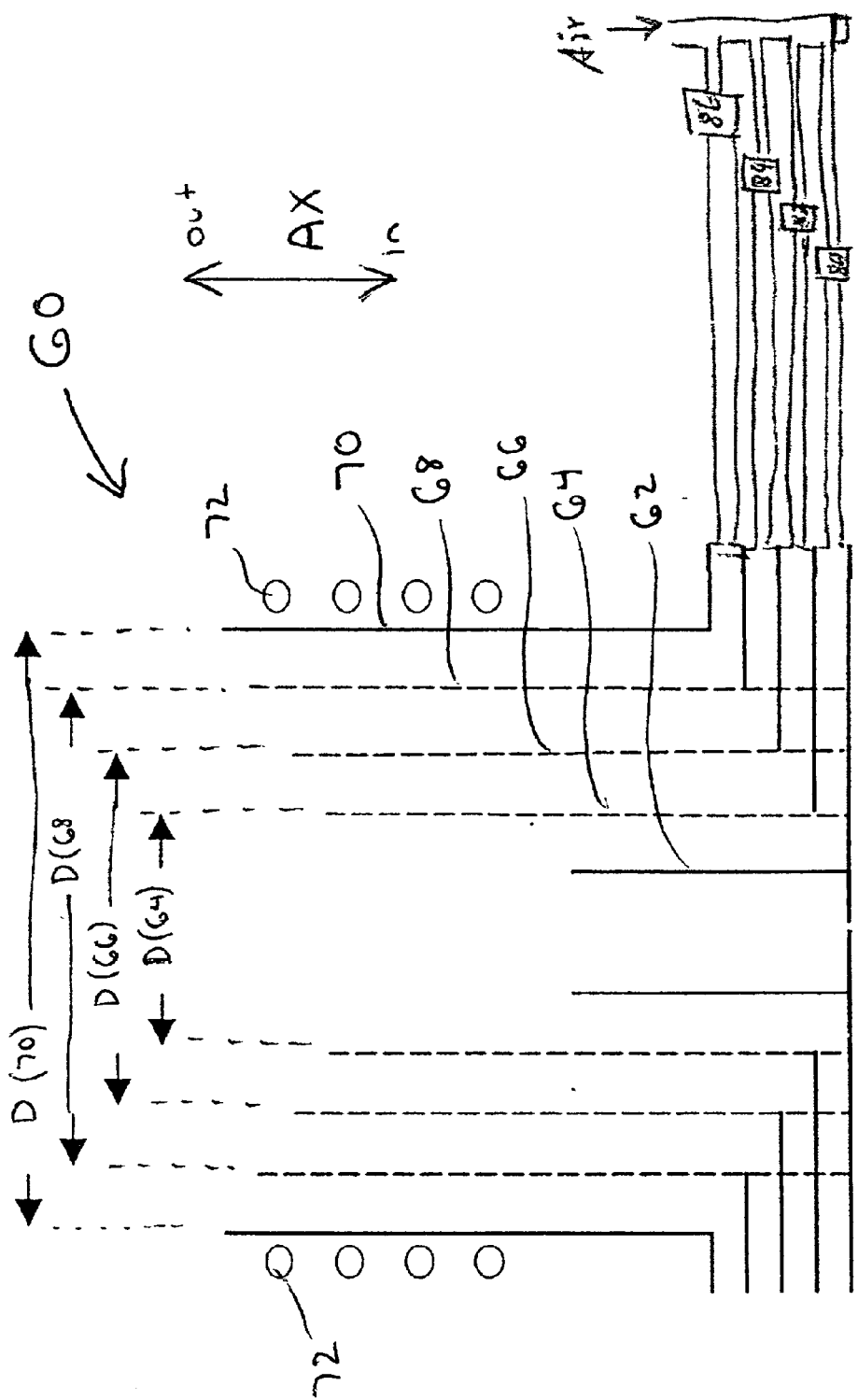
FIG. 11 is a sectional view through the BB projection lines of FIG. 10.

The above-described embodiments are shown, for purposes of description, as employing various arrangements of and sequences of depositing glass using fixed diameter plasma torches. Referring to FIGS. 10 and 11 a variable diameter plasma torch 60, which significantly reduces the hardware over the fixed diameter plasma torch arrangements described for the previous embodiments, will be described. FIG. 10 is a top view of the variable diameter plasma torch 60, and FIG. 11 is a cross-sectional view through the projection line BB of FIG. 10. The variable diameter plasma torch 60 shown at FIGS. 10 and 11 can be directly substituted for the four torches 4C1, 4C2, 4C3, and 4C4 employed in the example Second Embodiment.

Referring to FIG. 10, the variable diameter torch 60 comprises an inner tube 62, and four concentric quartz glass tubes labeled as 64, 66, 68, and 70. A copper conductor coil 72 surrounds the outer quartz tube 70. The diameter of ring 64 is labeled D(64), and the diameters of rings 66, 68 and 70 are labeled D(66), D(68) and D(70), respectively.

Two example structures for the variable torch 60 will be described, each example being a substitute for all four torches 4C1, 4C2, 4C3, and 4C4 of Embodiment 2.

In a first example structure, which provides a precision control of the tubes heights, each of the tubes 64, 66 and 68 is independently movable in the axial or height direction AX. The torch rings 64, 66 and 68 are selectively positioned in the height direction AX, by ring steppers (not shown) to change the diameter of the torch. The present inventors have identified a preferred precision of the torch ring positioning and, hence, for the ring steppers, for the example ring dimensions D(64), D(66), D(68) and D(70) described above, to be approximately 0.1 mm. The ring steppers (not shown) are conventional, commercially available precision stepper motors and associated precision drive mechanisms, using a conventional commercially available microprocessor-based controller unit (not shown), all of these being readily selected and configured in accordance with standard criteria and methods well known to persons of skill in the art to which this invention relates.

The second example structure for the variable torch 60 features fixed heights for the ring tube, which simpler than the first and, for some applications, may be preferred. However, the height of the inside ring 64 will be lower than the outer ones. It will allow the proper mixture of the plasma gas and achieve the desired the flow condition. Table 2 provides an example set of diameter and height values.

TABLE 2

| Ring  | Diameter (mm) | Height (mm) |
|-------|---------------|-------------|
| D(64) | 60            | 215         |
| D(66) | 80            | 218         |
| D(68) | 100           | 221         |
| D(70) | 120           | 224         |

There is some leakage of the plasma gases outward and by adjusting operation parameters a desired flow condition to accommodate this difference. More particularly, a key operation parameter is a constant Surface Velocity over the torch, where Surface Velocity is defined as:

$$\text{Surface\_Velocity} = \frac{\text{Total\_Flow\_Rate}}{\text{Cross\_Sectional\_Area}} = \frac{F}{A}, \quad (2)$$

Cross Sectional Area is the cross sectional area of the torch, where the plasma gasses are actually flowing.

By controlling the Surface Velocity a smooth operation, and more importantly, the quality of the deposited glass can be maintained. The present inventors have found that for purposes of this invention an optimum Surface Velocity is approximately 35 meters/minute (m/m). Since the Surface Velocity must be maintained constant at or near the predetermined optimal value, the ratio of the total flow rate F to the cross sectional area A must be kept constant. However, the cross section area of the torch cannot remain constant if full coverage of the target(s) is to be maintained and, as seen from FIGS. 10 and 11, the cross section area is made larger by sequentially enabling the torch rings 64, 66, 68 and 70, as described below. Therefore, the only available variable in Equation (2) is the total flow rate. The apparatus of this embodiment, as described in further detail below, uses a mass flow controller (MFC) to vary the total flow rate, thereby maintaining the Surface Velocity at a predetermined constant value. The MFC for this example embodiment is a commercially available unit, from suppliers including, but not limited to, Tylan General™, Unit Instruments™, MKS™, and Aera™. As shown in FIG. 11, the MFCs 80, 82, 84, 86 are used to control the plasma gas for torch rings 64, 66, 68, and 70, respectively.

In continuing the above example, to maintain the constant surface velocity of 35 m/m MFC 80 is initially set, for torch ring 64, at 100 liters/minute (l/m). When torch ring 66 is activated, MFC 80 will maintain the same 100 l/m flow rate and MFC 82 will have a flow of 75 l/m. When torch ring 68 is activated, MFCs 80 and 82 still has the same 100 and 75 l/m flow rate respectively but MFC 84 will have a flow rate of 100 l/m. When the last torch ring, 86, is used, the MFC 80, 82, and 84 will have the same flow rate of 100, 75 and 100 l/m, respectively, but the MFC 86 will need a flow rate of 120 l/m. By using these flow rates, the surface velocity will be maintained constant about 35 m/m.

Referring to FIG. 10, the depicted example variable torch 60 further comprises two or more nozzles 74, located in the same plane, with two being used for the particular example depicted. The nozzles 74 are positioned opposite to each other, as shown, or at other pre-determined angles (not shown). The vertical position of the nozzles 74 is in accordance with the description of the same as recited by the '970 application. The nozzles 74 are mounted to a precision micromovement device (not shown) and driven in the radial direction R labeled in the figure by a conventional commercially available stepping motor (not shown). An example stepping motor is a type PD 42-18.35 made by the RK Rose+Kriegel GmbH & CO. KG™, together with an associated precision micromovement device available from the same supplier. Equivalent models of stepping motors and precision micromovement devices are available from various commercial suppliers known to persons of skill in the art.

The nozzles 74 are connected by flexible tubings (not shown) to the rigid main gas deliver lines (not shown), the flexible tubings having sufficient slack to accommodate the full range of nozzle 74 motion.

The above-identified control unit controls the nozzle stepper to selectively position the opening (not labeled) of each of the nozzles 74 to a location around the circumference of a selected tube from among tubes 64, 66, 68 and 70. The selected tube corresponds to configures the desired diameter of the torch 60.

The described structure for controlling the position of the nozzles 74 in the radial direction R permits the same nozzles 74 to be used for all of the concentric quartz glass tubes 64, 66, 68 and 70, i.e., for all of the different torch diameters.

Figure 12:
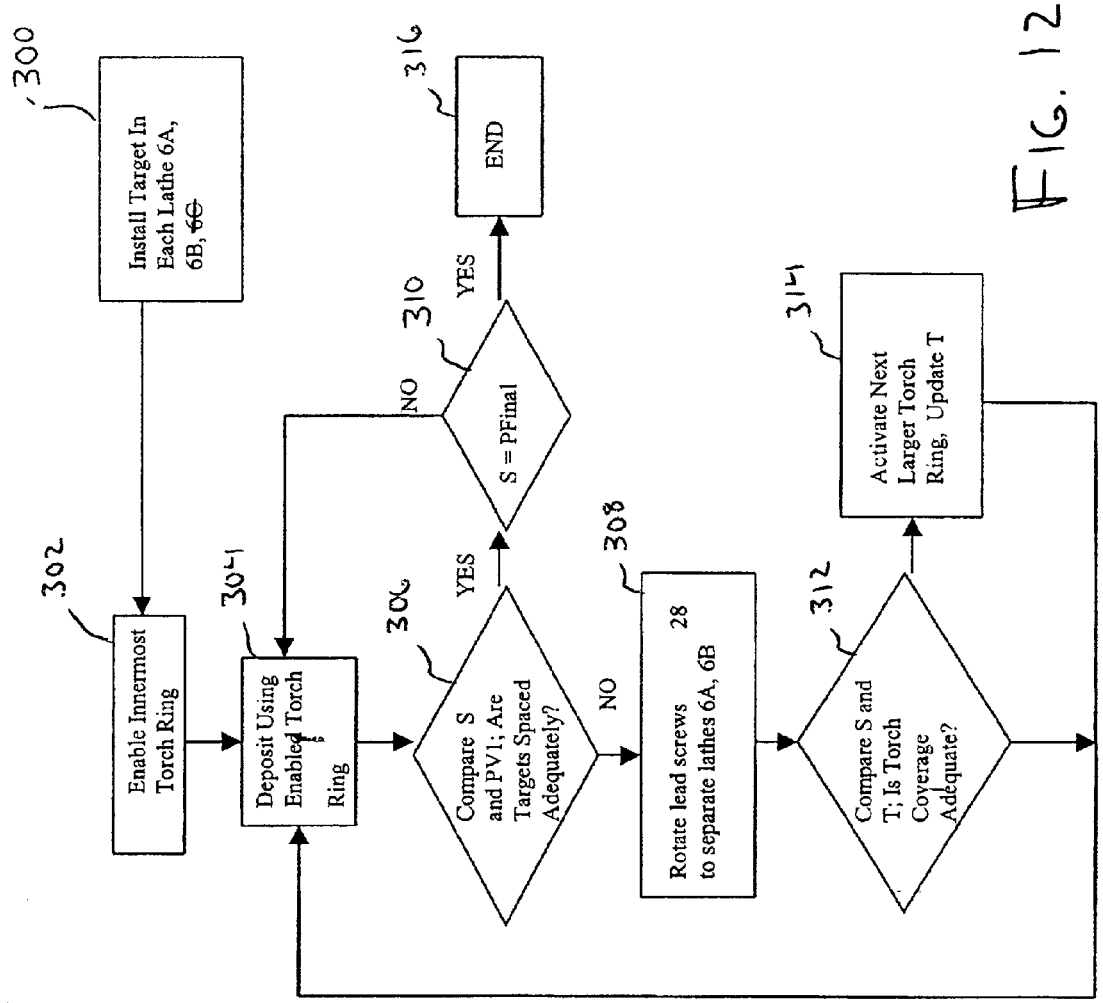
FIG. 12 is a method flow diagram for an example operation of the variable diameter plasma torch of FIGS. 10 and 11.

Referring to FIG. 12, an example process using the variable diameter torch 60 is described. Unless otherwise described, the process is that described for Example Embodiments Two and Three, with the single variable torch 60 substituted for the multiple torches of the previously described embodiments. More specifically, at step 300, one target 2 is installed in each of lathes 6A and 6B of the apparatus FIGS. 7A and 7B or of FIGS. 8A and 8B. Each target 2 has a starting diameter of 25 mm. Next, at step 302, the nozzles 74 of FIG. 10 are moved to enable the inner most quartz tube, or torch ring, 64. For this example the diameter D(64) of the torch ring 64 is 60 mm. Next, at step 304 deposition begins onto the two targets 2. Step 306 compares the diameter of the targets to the their center-to-center spacing to determine if the spacing is adequate, as described for step 204 of FIG. 9, based on the output S of the target sensor 22 and the lathe position value PV1. If the answer is "no", the process goes to step 308 and repositions the lathes 6A and 6B, as described for step 208 of FIG. 9. After step 308, the process goes to step 312 and determines if the torch 60 is configured to adequately cover the targets. The determination is made based on the target diameter signal S and the center-to-center spacing indicated by PV1, and a torch threshold T which is set according to which of the rings 64, 66, 68 and 70 is activated. For the first loop through the process of FIG. 12 the threshold T set to correspond to the innermost torch ring 64. For this example the first threshold is being 35 mm. If step 312 identifies that the torch 60 does not have adequate diameter, the process goes to step to step 314 to switch over to the larger torch ring 66.

To carry out step 314 the microprocessor-based controller issues a sequence of changing commands (not shown) in response to signals from the target sensor 22. One command stops the source chemical flow to the nozzles by closing the chemical flow valves (not shown) and, at the same time, opens the valve for a purge gas, such as air or nitrogen. Another command to the designated MFC sets the chemical flow rate to a desired value, which increases the plasma gas flow but maintain the constant surface velocity. Another command causes the nozzle stepper to retract the nozzles 74 backwards in the R direction to match the 80 mm torch ring 66. The plasma torch 60 is then re-started with the 80 mm torch ring 66, the torch threshold T is updated to reflect the 80 mm diameter, the process loops back to step and deposition is resumed.

When step 312 detects that the 80 mm diameter of the torch ring 66 is inadequate, the process goes to step 314 and switches over to the next larger ring 68 (100 mm). Similarly, when step 312 detects that the 100 mm diameter of the torch ring 70 is inadequate, the process goes to step 314 and switches over to the largest (for this example) ring 68 (120 mm).

Step 310 in a manner similar to step 206 of FIG. 9 detects when the target has reached its final process diameter, shown as S=PFinal, whereupon the process goes to step 316 and ends.

The variable torch 60 shown at FIGS. 10 and 11 is for purposes of example only. For example, more than four concentric tubes or rings, i.e., 64, 66, 68 and 70, could be used.

To have a smooth operation, the retractable nozzles 62 should have precision motion control, typically in the range of 0.1 mm. Further, a preferred embodiment includes a feedback loop (not shown) for monitoring the coupling of plasma power and compensating the changes in the induction (L) during the switch-over steps and during the entire deposition operation. The change of the inductance (L) will change the frequency (f) of the plasma generator, and they are related by this relationship:

$$f = \frac{1}{2\pi\sqrt{LC}} \quad (3)$$

where C is a capacitance inherent in the power supply to the torch. During the operation, the capacitance C is constant. When the inductance L changes; it will change the frequency. A feedback loop will detect and automatically adjust the capacitance and maintain the constant frequency.

The advantages of the variable torch 60 are that it requires one generator and one torch only. In addition, during the operation, there is no need of switchover of the torches and of the generator. The variable torch 60 also requires substantially less space than the multiple torch apparatus of the previously described embodiment. The space saving also means there is no need to increase the length of the lathe to accommodate multiple torches.

It is to be understood that the present invention is described above in reference to specific embodiments, which are for purposes of example only, and that the invention is not limited to the specific arrangement, or configuration described hereinabove or shown in the drawings, but also comprises the various modifications readily apparent to one skilled in the art upon reading this specification, as defined by the broadest scope of the appended claims.

What is claimed is:

1. A method for forming optical fiber preforms, comprising steps of:
    providing a first plasma torch having a coil for coupling plasma energy, said coil having a first diameter;
    providing a plurality of targets, each having a longitudinal axis, arranged such that said longitudinal axes are separated from one another by a spacing distance normal to said longitudinal axes;
    rotating said plurality of targets simultaneously about mutually parallel axes of rotation;
    depositing a glass simultaneously on said plurality of targets, using said first plasma torch, to form a plurality of intermediate preforms each having a first preform diameter;
    providing a plurality of second plasma torches, each having a coil for coupling plasma energy, each of said coils having a second diameter, said second diameter being smaller than said first diameter; and
    depositing a glass on said plurality of intermediate preforms using said plurality of second plasma torches to form a corresponding plurality of final preforms.

2. A method according to claim 1, wherein a sum of said spacing distances of all adjacent pairs of said targets is less than said first coil diameter.

3. A method for forming optical fiber preforms, comprising steps of:
    providing a plurality of targets;
    rotating said plurality of targets simultaneously about mutually parallel axes of rotation;
    providing a first plasma torch having a coil for coupling plasma energy, said coil having a first diameter;
    depositing glass on said targets by moving said first plasma torch along said targets parallel to said axes of rotation;
    providing a second plasma torch having a coil for coupling plasma energy over a portion of each of said plurality of targets, said coil having a second diameter, said second diameter being greater than said first diameter; and
    depositing glass on said targets by moving said second plasma torch along said targets parallel to said axes of rotation.

4. A method for forming optical fiber preforms, comprising steps of:
    providing a first plasma torch having a coil for coupling plasma energy, said coil having a first diameter;
    providing a plurality of targets, each having a longitudinal axis, arranged such that said longitudinal axes are separated from one another by a spacing distance normal to said longitudinal axes;
    rotating said plurality of targets simultaneously about their respective longitudinal axes;
    depositing a glass simultaneously on said plurality of targets, using a plasma torch;
    detecting a diameter of one or more of said targets;
    increasing said spacing in response to said detected diameter; and
    depositing a glass simultaneously on said plurality of targets with their longitudinal axes separated from one another by said increased spacing.

5. A method for forming optical fiber preforms, comprising steps of:
    providing one plasma torch having a coil for coupling plasma energy, said coil having a fixed diameter;
    providing a plurality of targets, each having a longitudinal axis, arranged such that said longitudinal axes are separated from one another by a spacing distance normal to said longitudinal axes;
    rotating said plurality of targets simultaneously about their respective longitudinal axes;
    depositing a glass simultaneously on said plurality of targets, using a plasma torch;
    detecting a diameter of one or more of said targets;
    increasing said spacing in response to said detected diameter;
    modifying the plasma torch by increasing the cross section area of the plasma torch and keeping the surface velocity constant; and
    depositing a glass simultaneously on said plurality of targets with their longitudinal axes separated from one another by said increased spacing.

* * * * *